(12) United States Patent
Wistow (10) Patent No.: US 10,666,757 B2
(45) Date of Patent: May 26, 2020

(54) CONTENT DELIVERY NETWORK TRANSITIONAL CACHING

(71) Applicant: Fastly, Inc., San Francisco, CA (US)

(72) Inventor: Simon Wistow, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 423 days.

(21) Appl. No.: 15/278,600

(22) Filed: Sep. 28, 2016

(65) Prior Publication Data
US 2017/0094009 A1  Mar. 30, 2017

Related U.S. Application Data

(60) Provisional application No. 62/234,156, filed on Sep. 29, 2015.

(51) Int. Cl.
*H04L 29/06* (2006.01)
*H04L 29/08* (2006.01)
*H04L 29/12* (2006.01)

(52) U.S. Cl.
CPC ...... *H04L 67/2847* (2013.01); *H04L 61/1511* (2013.01); *H04L 65/102* (2013.01); *H04L 67/02* (2013.01); *H04L 67/2885* (2013.01)

(58) Field of Classification Search
CPC .................................................. H04L 67/2847
See application file for complete search history.

(56) References Cited

U.S. PATENT DOCUMENTS 9,871,850 B1 *  1/2018  Brandwine ............. H04L 67/10
2016/0182582 A1 *  6/2016  Wagenaar ........... H04L 65/4069
                                                        709/231

* cited by examiner

*Primary Examiner* — Adnan M Mirza (57) ABSTRACT

Systems, methods, apparatus, and software for transitional caching in content delivery networks includes edge cache nodes configured to receive and reply to content requests. Content can be cached in edge cache nodes before receiving user requests or retrieved from an origin server. A transitional cache node array is configured to receive content requests from edge cache nodes and to receive origin content from edge cache nodes and/or origin servers, as well as to modify origin content to generate modified content. Modified content can include re-written origin content (e.g., translations), transcoded data (e.g., video), compressed or otherwise adjusted data (e.g., images), and transformed files (e.g., CSS and JavaScript files), among others. In addition to assisting with original and modified content flow to end users, transitional caching also can assist in threat detection and mitigation within a CDN, helping to protect the network, origin servers and the like.

18 Claims, 8 Drawing Sheets

CONTENT DELIVERY NETWORK TRANSITIONAL CACHING

RELATED APPLICATIONS

This application hereby claims the benefit of and priority to U.S. Provisional Patent Application 62/234,156, titled "CONTENT DELIVERY NETWORK TRANSITIONAL CACHING," filed Sep. 29, 2015, and which is hereby incorporated by reference in its entirety.

TECHNICAL BACKGROUND

Network-provided content, such as Internet web pages and the like, are typically served to end users via networked computer systems. End user requests for network content are processed and the content is responsively provided over various network links. These networked computer systems can include origin or hosting servers that originally host network content, such as web servers for hosting a news website. However, computer systems consisting solely of individual content origins or hosts can become overloaded and slow due to frequent requests of content by end users.

Content delivery networks (CDNs) add a layer of caching between content providers' original servers and end users. Content delivery networks typically have multiple distributed edge cache nodes that provide end users with faster access to content. When an end user requests content, such as a web page, the request is handled by an edge cache node that is configured to respond to the end user request (e.g., instead of an origin server). Specifically, when an end user directs a content request to a given origin server, the domain name system (DNS) resolves to an edge cache node (frequently the edge node is selected as an optimized server) instead of the origin server and the edge cache node handles that request.

Thus an edge cache node acts as a proxy or cache for one or more origin servers. Various types of origin server content can be cached in the content delivery network's various cache nodes. When all or a portion of the requested content has not been cached by an edge cache node, that edge cache node typically requests the relevant content (or portion thereof) from the appropriate origin server(s) on behalf of the end user.

OVERVIEW

Various implementations of transitional caching in content delivery networks and the like include a plurality of edge cache nodes that are configured to receive end user content requests, obtain the requested content, and respond to the end user requests. The content can be cached in the edge cache nodes prior to receiving an end user request or can be retrieved from an origin server or the like. A transitional cache node array is configured to receive content requests from the edge cache nodes and to receive origin content from the edge cache nodes and/or the origin servers. The transitional cache node array also is configured to modify origin content to generate modified content. The transitional cache nodes can in some implementations therefore reply to both origin content requests (e.g., when a transitional cache node has pre-cached origin content that an edge cache node does not have cached) and modified content requests (e.g., when a transitional cache node has modified origin content and cached the modified content resulting therefrom) from the edge cache nodes. Pre-caching involves caching content in the intermediate transitional cache nodes rather than in edge cache nodes.

Modification of origin content to generate modified content can include re-writing origin content in various languages (i.e., translation), transcoding data (e.g., video) to prevalent bit rates, compressing or otherwise adjusting data (e.g., images) to accommodate prevalent sizes and formats, and transforming files (e.g., CSS and JavaScript files) as needed.

In addition to assisting with the flow of original and modified content to end users, implementations of transitional caching in content delivery networks and the like also can assist in threat detection and mitigation within a CDN, helping to protect the network as well as origin servers and the like.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Also, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DETAILED DESCRIPTION

Network content such as web content typically comprises text, hypertext markup language (HTML) pages, pictures, digital media content, video, audio, code, scripts, and/or other content viewable on and rendered by an end user device in a browser or other specialized application. Such network-provided content, such as Internet web pages and the like, is typically served to end users via networked computer systems that provide requested content over various network links. A content delivery network (a "CDN") is an example of such a networked computer system.

Content delivery networks employ edge cache nodes that are configured to respond to end user requests for content (e.g., a web page) by sending the web page's "primary resource" (e.g., a hypertext mark-up language (HTML) file, such as XHTML or HTML5 files and the like) to an end user device's web browser, which "loads" (or "renders" or "parses") the web page in accordance with an appropriate standard (e.g., the HTML5 specification) and/or model (e.g., the Document Object Model (DOM) that organizes the nodes of a document (web page) in a tree structure known as a DOM tree). Web browsers identify and organize the various elements of a web page to generate the page displayed on a user's device.

Figure 1:
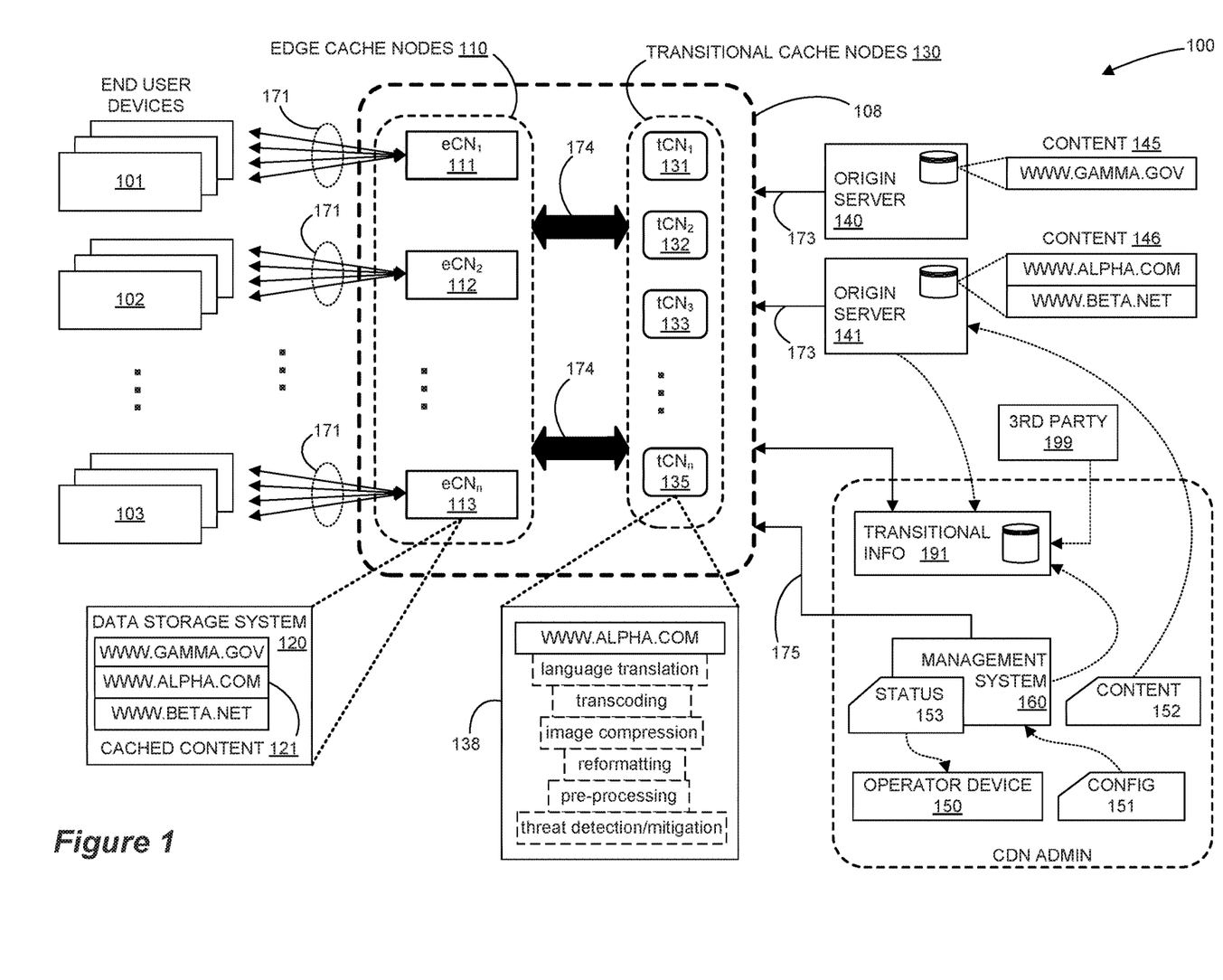
FIG. 1 illustrates a communication system.

FIG. 1 illustrates an exemplary content delivery system 100 that includes content delivery network (CDN) 108, end user devices 101, 102, 103, origin servers 140, 141, and management system 160. Content delivery network 108 includes an edge cache node array 110, which can include edge cache nodes (eCNs) 111, 112, 113, each of which can possess suitable processing resources and one or more data storage systems. Each eCN 111-113 communicates with each other eCN over CDN network links. Each of eCN 111-113 can include one or more data storage systems, such as data storage system 120 (illustrated for eCN 113) which can store cached content 121 comprised of content 145-146 obtained from servers 140-141.

End user devices 101-103 are representative of a plurality of end user communication devices that can request and receive content from CDN 108. The transfer of content from CDN 108 to a given end user device is initiated when a specific user device 101-103 associated with a given edge cache node 111-113 transmits a request for content to its corresponding edge cache node (any number of end user devices 101-103 can be associated with a single edge cache node). Edge cache nodes 111-113 and end users 101-103 communicate over associated network links 171. Other network components likewise communicate over appropriate links.

Management system 160 (which, for example, can be part of content delivery network administration in some implementations) collects and delivers various administrative and other data, for example configuration changes and status information (e.g., for various parties such as system operators, origin server operators, managers and the like). For example, operator device 150 can transfer configuration data 151 for delivery to management system 160, where configuration data 151 can, for example, alter caching and the handling of network content requests by eCNs 111-113, among other operations. Also, management system 160 can monitor status information for the operation of CDN 108, such as operational statistics, and provide status information 153 to operator device 150. Furthermore, operator device 150 can transfer content 152 for delivery to origin servers 140-141 to include in content 145-146. Although one operator device 150 is shown in FIG. 1, it should be understood that this is merely representative and communication system 100 can include multiple operator devices for receiving status information, providing configuration information, or transferring content to origin servers. Content delivery network 108 and management system 160 communicate over link 175.

Content cached in and/or obtained by one of the eCNs 111-113 is used to respond to end user requests by transmitting requested content to the end user device. As is well known in the art, content delivery network 108 can cache content from origin content sources such as origin servers 140-141 and can also seek and obtain content that is not cached by communicating directly with origin content sources (e.g., origin servers 140-141 over associated network links 173). FIG. 1 shows cached content 121 included in data storage system 120 of edge cache node 113 as comprised of content 145-146. Other configurations are possible, including subsets of content 145-146 being cached in individual ones of eCN 111-113. Although FIG. 1 shows content 145-146 of origin servers 140-141 being cached by data storage system 120, other content can be handled by eCN 111-113.

Some implementations deploying transitional caching in content delivery networks utilize transitional cache nodes that can be configured to provide one or more functions, services, etc. that are "off-loaded" from and/or supplement either content origins (e.g., origin servers 140, 141 of FIG. 1) and/or edge cache nodes (e.g., nodes 111-113 of FIG. 1). One non-limiting example of such transitional caching is a transitional cache node array 130 as shown in FIG. 1. Array 130 includes individual transitional cache nodes (tCNs) 131, 132, 133, 135. Implementations of CDN transitional caching can utilize this transitional caching array in various ways. In FIG. 1, content 146 from origin server 141 is provided to and is cached in transitional cache node 135. Various functions and services 138 can be made available in node 135 in addition to storing origin content from origin servers.

Transitional cache node array 130 is shown as part of CDN 108, though the transitional cache nodes can be more distributed and some or all of it may operate "outside" the relevant CDN. In implementations where the array 130 is internal to CDN 108, as shown in the non-limiting example of FIG. 1, dedicated communication links 174 can be implemented to facilitate and speed communication and data transfer between tCNs 131-135 and eCNs 111-113. In some implementations the transitional caching is invisible to parties outside the CDN, such as origin servers 140, 141 and end users 101-103—that is, those parties in such implementations see the CDN and not its individual components. In other implementations one or more of those parties may be aware of the transitional caching function and have the option of utilizing it as that party deems appropriate. For example, an origin server might direct certain content to transitional caching array 130 to pre-cache the CDN 108 with content that represents high-volume traffic without substantial changes over time, essentially allowing the eCNs 111-113 to run lean so that content requests are answered promptly without the need for storing as much content within the edge cache node array 110. Pre-caching can include caching origin content and/or modified content at the request of a content provider, based on historical data relating to the operation of the edge cache nodes, and/or on other bases. Pre-caching of the transitional cache node array 130 can reduce the caching requirements and improve the diversity of origin content and modified content available to the edge cache node array 110.

Moreover, even in configurations in which origin servers and the like are unaware of the transitional caching capabilities, these may nevertheless be used as an additional destination and/or the initial destination of content being supplied to the CDN 108. If an edge cache node is responding to an end user request to deliver content, that content may be directed initially to the relevant edge cache node 111-113, while a copy or other information regarding the content may be sent to the transitional cache node array 130 for processing. In such situations, the content may be chosen by CDN 108 based on historical data and/or other intelligent caching criteria to determine which content is most likely to benefit from such transitional caching processing. In the non-limiting example of FIG. 1, a transitional information module 191 or the like can receive, manage and store historical data, performance data, instructions and/or other information that assists transitional cache node array 130 in one or more ways. For example, instructions or data stored in module 191 can assist array 130 in determining what the most relevant content is (for a group of content providers, for all providers, or for a specified provider) and can inform decisions on what content should be stored on one or more edge cache nodes in array 110 and what content should be stored on one or more transitional cache nodes in array 130 (including content that might benefit from pre-processing as described herein).

Figure 2A:
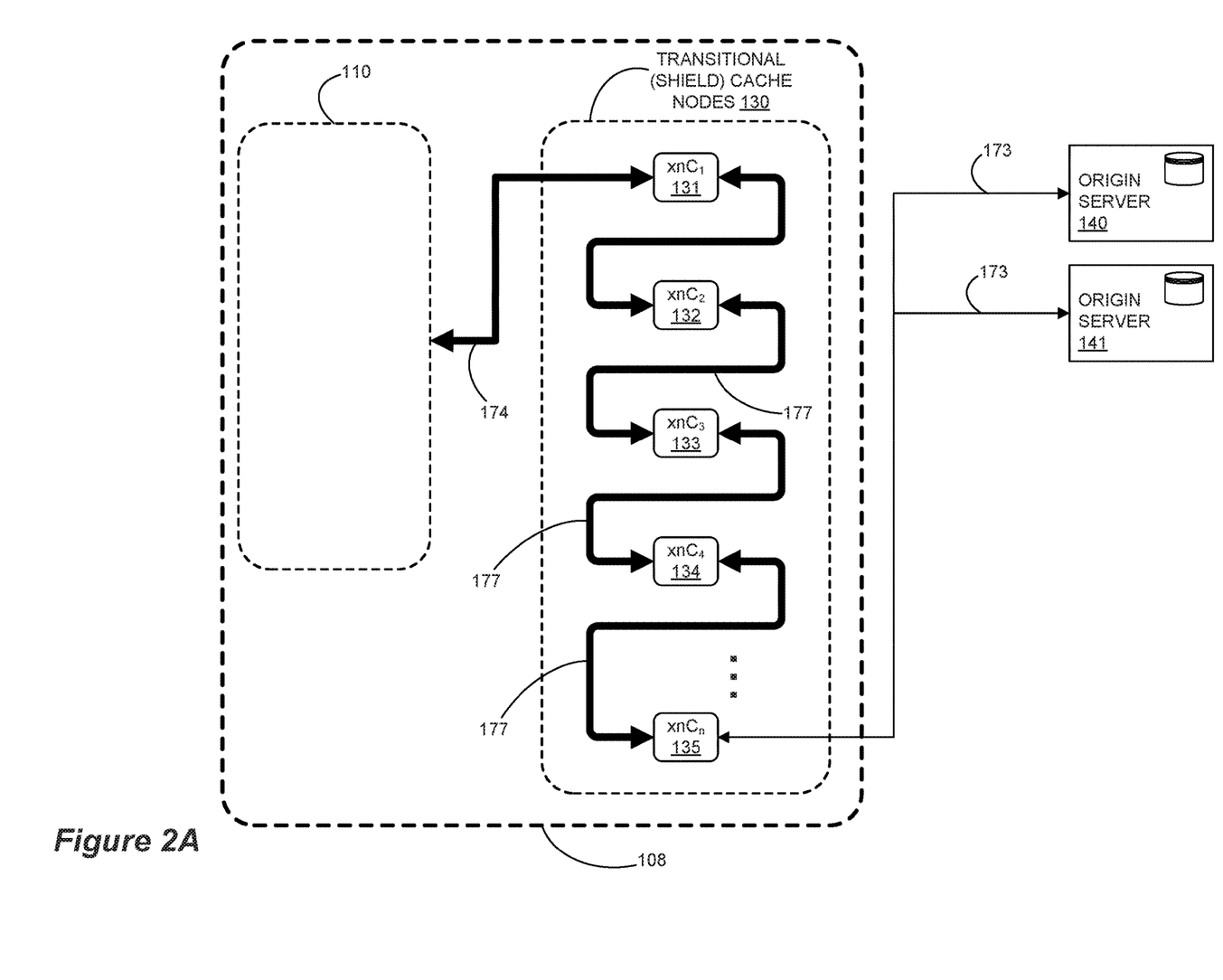
FIG. 2A illustrates one or more implementations of a transitional cache node array in which transitional cache nodes are coupled in series in connection with use of the array in a communication system.
Figure 2B:
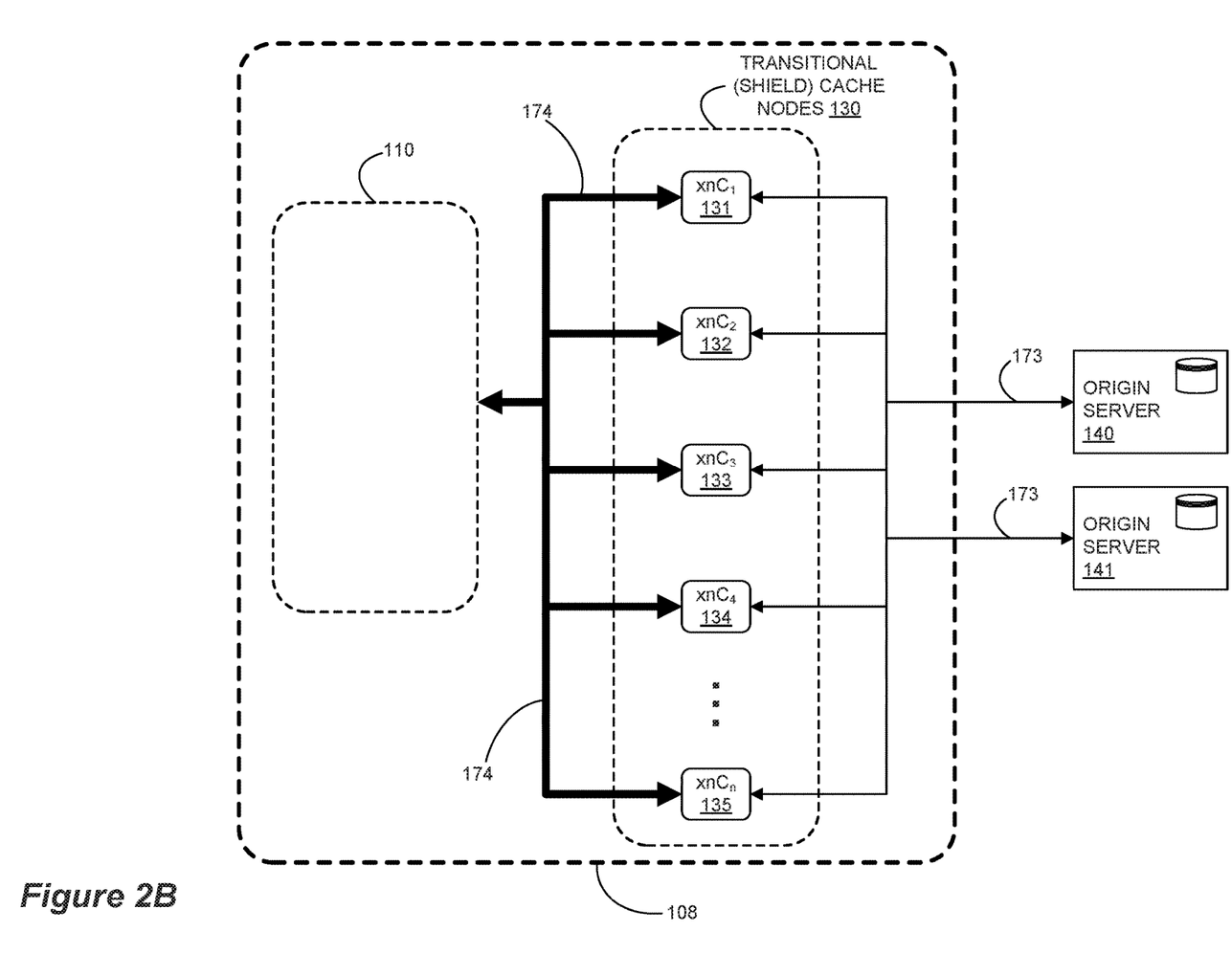
FIG. 2B illustrates one or more implementations of a transitional cache node array in which transitional cache nodes are coupled in series in connection with use of the array in a communication system.

In some implementations the transitional cache node array serves as an intermediary in the CDN and communicates directly with origin servers and communicates directly with edge cache nodes (e.g., as shown in FIGS. 2A and 2B). Origin content is sent from origin servers to the transitional cache nodes for initial caching and pre-processing, for example. Pre-processing can include anticipatory pre-processing (i.e., modifying content formats and other customary modifications) and live pre-processing, where origin content is modified to respond to a pending end user request. Whether anticipatory or live, such pre-processing offloads such functions from the edge cache nodes and allows them to cache and deliver more efficiently.

If, for example, one or more web pages are in high demand by end users, pre-processing of that content might be beneficial. In such situations the content may include images and/or video and may be in high demand (e.g., as detected and/or determined vis-à-vis thresholds, limits, ranges and/or other metrics) by end users in a wide variety of geographic locations using a variety of access technologies and capabilities. Such high-demand content can be processed to re-write the content in various languages (i.e., translation), to transcode video to prevalent bit rates, to compress or otherwise adjust images to accommodate prevalent sizes and formats, and to transform CSS and JavaScript files as needed. In implementations where a transitional cache node array functions to support replying to end user requests, the edge cache node array 110 can utilize (and "see") the transitional cache node array 130 as a "virtual origin," while origin servers simultaneously can utilize (and "see") the transitional cache node array 130 as a "virtual edge node."

Pre-processing can include a variety of functions, processes, etc. For example, some content can include large source files, such as digital media including movies, live broadcasts, audio files, or user-generated videos, which in some cases might be cached by the content delivery network. However, end users frequently request different formats or containers for such digital media, leading to potentially having to cache many different versions office action copies of large files in CDN nodes. Content delivery networks can struggle with large digital media files, such as movies, live broadcasts, large audio files, or user-generated videos, since caching of the large media files can lead to poor performance or unreasonable storage requirements due to the process of caching entire large media file from an origin server to a content node. Also, the digital format or digital container of these media files can be unsuitable for streaming to an end user.

Transcoding and transmuxing of the media files prior to end user requests for the media also can be time consuming and require further data storage to store multiple versions of each media file. Transcoding typically involves changing properties of the content, such as a bit rate, encoding scheme, frame rate, resolution, compression, or other properties. Transmuxing, in contrast, changes a container or wrapper associated with the media content, such as changing from one media container format suitable for viewing a medial file on a local machine, to a different media container format suitable for streaming over a network or the Internet.

Transitional caching also can be implemented bi-directionally to assist in shielding origin servers from both high volumes (whether from end users or edge cache nodes) and from malicious activities directed at the CDN and/or one or more origin servers without the need for additional processing, scanning, etc. within edge cache nodes. When edge cache nodes are maintained in a lean mode, functioning to pass end user requests to transitional cache nodes and responding with content stored on the edge cache nodes, stored on one or more transitional cache nodes, and/or obtained from origin servers and the like, the transitional cache nodes also can function as shield nodes to assist with evaluating and detecting distributed denial of service attacks and the like. The bandwidth and computational capabilities of the transitional cache nodes allows the edge cache nodes to maintain high operational performance while the transitional cache node resources absorb the processing overhead that accompanies DoS evaluation and mitigation efforts.

In addition to diluting or otherwise mitigating DoS attacks, transitional caching can further insulate origin servers and other parties from malicious network traffic. If malware or the like is being trafficked with, within, or to content being served by the CDN, transitional caching can be used to filter out such problems either on its way to an origin server or from an origin server (or both). Thus transitional caching can act as a shield between end users and origin servers without bogging down edge cache nodes with inordinate scanning and/or processing functions.

A transitional cache node array can be organized in a variety of configurations, depending on the number of transitional cache nodes, any functional specialization within the transitional cache nodes, the number of edge cache nodes serviced by a given transitional cache node array, expected traffic, etc. FIG. 2A illustrates a chained or in series arrangement of transitional cache nodes (tCNs) 131, 132, 133, 134, 135 connected to one another via communication links 177, to edge cache node array 110 via communication link 174, and to origin servers 140, 141 via communication links 173. Another implementation of transitional cache node array 130 is illustrated in FIG. 2B (in both FIGS. 2A and 2B the transitional cache node array can provide pre-processing and other functional roles for "outbound" content from the origin servers to edge cache nodes and end users and for threat detection and mitigation on "inbound" communications to the CDN, thus allowing the transitional cache node array also to function as a shield node array), wherein the transitional cache nodes (tCNs) 131, 132, 133, 134, 135 are connected in parallel to both the edge cache node array 110 (via communication links 174) and to origin servers 140, 141 (via communication links 173). Various combinations of parallel and series connections, as well as other logical arrangements of transitional cache nodes can be implemented as desired. As noted in connection with implementations shown in FIG. 1, internal communication links between edge cache nodes and transitional cache nodes (e.g., links 174 and 177 in FIGS. 1, 2A and 2B) can be high speed dedicated links that facilitate exchanges of data between the edge cache nodes and the transitional cache nodes.

Figure 3:
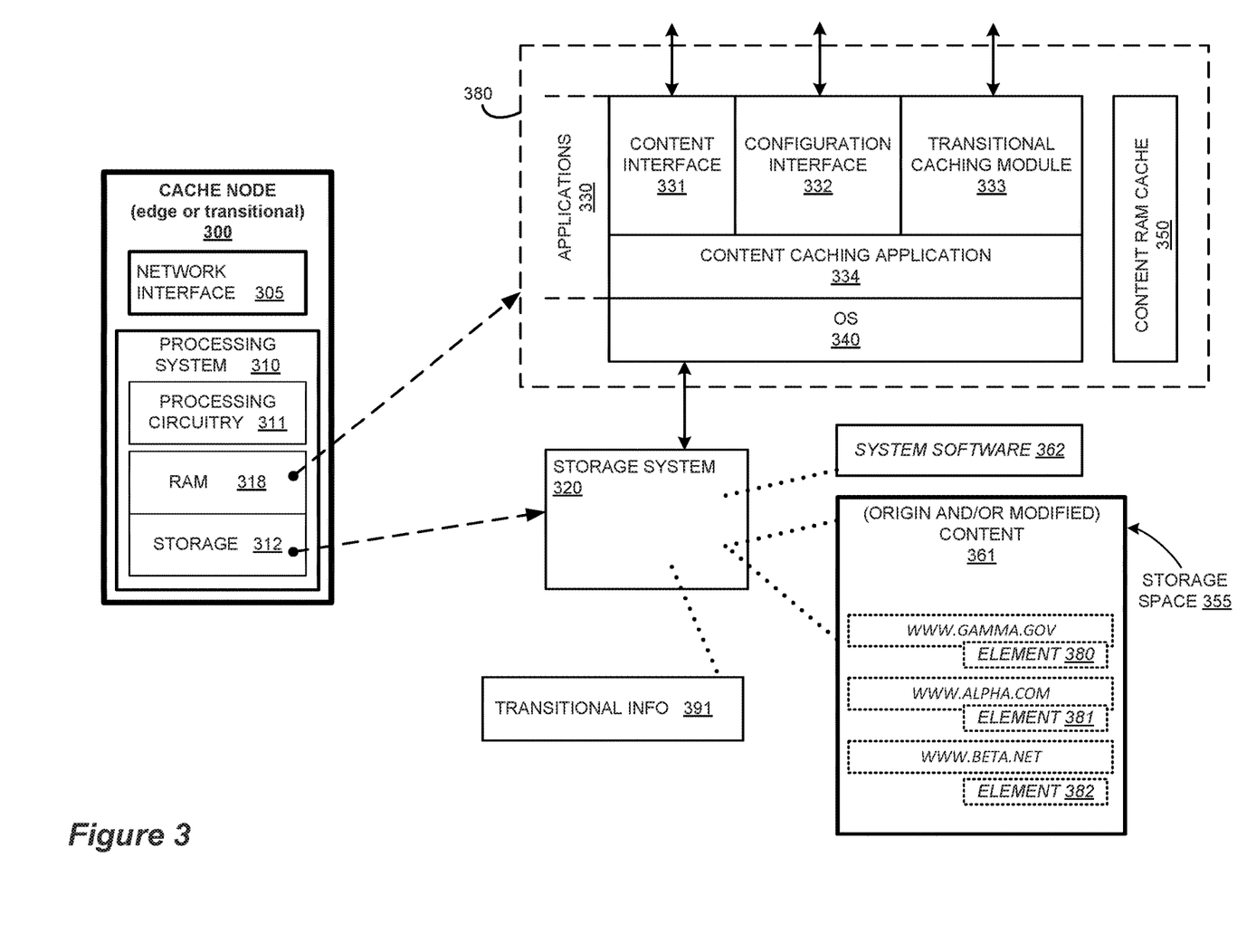
FIG. 3 illustrates one or more implementations of a cache node.

FIG. 3 illustrates one or more implementations of a cache node 300 that can be used in connection with content delivery network transitional caching. Cache node 300 can be an example of one of the edge cache nodes 111-113 or one of the transitional cache nodes 131-135 of FIG. 1, although variations are possible. Cache node 300 includes network interface 305 and processing system 310. Processing system 310 includes processing circuitry 311, random access memory (RAM) 318, and storage 312, although further elements can be included. Exemplary contents of RAM 318 are further detailed in RAM space 380, and exemplary contents of storage 312 are further detailed in storage system 320.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device. In some examples, processing circuitry 311 includes physically distributed processing devices, such as cloud computing systems.

Network interface 305 includes one or more network interfaces for communicating over internal communications within a content delivery networks as well as communicating via communication networks, such as packet networks, the Internet, and the like. The network interfaces can include one or more local or wide area network communication interfaces which can communicate over Ethernet or Internet protocol (IP) links. Network interface 305 can include network interfaces configured to communicate using one or more network addresses, which can be associated with different network links. Examples of network interface 305 include network interface card equipment, transceivers, modems, and other communication circuitry.

RAM 318 and storage 312 together can comprise a non-transitory data storage system, although variations are possible. RAM 318 and storage 312 can each comprise any storage media readable by processing circuitry 311 and capable of storing software. RAM 318 can include volatile and nonvolatile, removable and non-removable media implemented in any method or technology for storage of information, such as computer readable instructions, data structures, program modules, or other data. Storage 312 can include non-volatile storage media, such as solid state storage media, flash memory, phase change memory, magnetic memory, or as illustrated by storage system 320 in this example. RAM 318 and storage 312 can each be implemented as a single storage device but can also be implemented across multiple storage devices or sub-systems. RAM 318 and storage 312 can each comprise additional elements, such as controllers, capable of communicating with processing circuitry 311. In some implementations, the storage media can be a non-transitory storage media. In some implementations, at least a portion of the storage media can be transitory. It should be understood that in no case are the storage media propagated signals.

Software stored on or in RAM 318 or storage 312 can comprise computer program instructions, firmware, or some other form of machine-readable processing instructions having processes that, when executed by a processing system, direct cache node 300 to operate as described herein (e.g., as an edge cache node or as an transitional cache node). In such non-limiting examples, software can drive cache node 300 to receive requests for original or modified content, determine whether requested content is stored in cache node 300, retrieve and/or receive content from origin servers, transfer content to end user devices, edge cache nodes and/or transitional cache nodes, evaluate transitional information, perform various edge cache node functions, transitional cache node functions (e.g., data transcoding, data transformation, image compression, re-writing content, threat detection and/ or mitigation), scan HTML and/or other files, edit HTML files and/or other files, manage data storage systems for handling and storing content, among other operations. The software can also include user software applications. The software can be implemented as a single application or as multiple applications. In general, the software can, when loaded into a processing system and executed, transform the processing system from a general-purpose device into a special-purpose device customized to operate as an edge cache node or an transitional cache node as described herein.

RAM space 380 illustrates a detailed view of an exemplary configuration of RAM 318. It should be understood that different configurations are possible. RAM space 380 includes applications 330, operating system (OS) 340, and content RAM cache 350. Content RAM cache 350 includes RAM space (e.g., dynamic random access memory (DRAM)) for temporary storage of content.

Applications 330 include content interface 331, configuration interface 332, transitional caching module 333, and content caching application 334. Content caching application 334 handles caching of content (both origin content and content that has been modified or is undergoing modification) and management of storage spaces, such as content RAM cache 350 and storage space 355, as well as exchanges involving content, data, and instructions via content interface 331, configuration interface 332, and transitional caching module 333. Content caching application 334 can comprise a custom application, Varnish caching software, hypertext transfer protocol (HTTP) accelerator software, or other content caching and storage applications, including variations, modifications, and improvements thereof. Moreover, adjustments can be made to content caching depending on whether cache node 300 is used as a edge cache node or as a transitional cache node. Applications 330 and OS 340 can reside in RAM space 380 during execution and operation of cache node 300, and can reside in system software storage space 362 on storage system 320 during a powered-off state, among other locations and states. Applications 330 and OS 340 can be loaded into RAM space 380 during a startup or boot procedure as described for computer operating systems and applications.

Content interface 331, configuration interface 332 and transitional caching module 333 each allow interaction between and exchange of data with content caching application 334. In some examples, each of content interface 331, configuration interface 332 and transitional caching module 333 comprise an application programming interface (API). Content interface 331 allows for exchanging content for caching in cache node 300 by content caching application 334, and can also receive instructions to purge or erase data from cache node 300. Content interface 331 can retrieve tracking elements as well as network and web page content from origin servers for delivery to end users, as well as transferring content between edge cache nodes and transitional cache nodes. Configuration interface 332 allows for altering the configuration of various operational features of content caching application 334. In some examples, configuration interface 332 comprises a scripting language interface, such as Varnish Configuration Language (VCL), Perl, PHP, JavaScript, or other scripting or interpreted language-based interfaces.

Transitional caching module 333 allows for controlling various operational features of content caching application 334 and can be configured to implement instructions regarding directing content to and from transitional cache nodes used for pre-processing, threat detection and mitigation, and other functions, for example in accordance with the description of such transitional cache node implementations discussed herein.

Content interface 331, configuration interface 332, and transitional caching module 333 can each communicate with external systems via network interface 305 over any associated network links. In further examples, one or more of elements 331, 332, 333 are implemented in VCL or VCL modules.

Storage system 320 illustrates a detailed view of an exemplary configuration of storage 312. Storage system 320 can comprise flash memory such as NAND flash or NOR flash memory, phase change memory, magnetic memory, among other solid state storage technologies. As shown in FIG. 3, storage system 320 includes system software 362, as well as content 361 stored in storage space 355. As described above, system software 362 can be a non-volatile storage space for applications 330 and OS 340 during a powered-down state of cache node 300, among other operating software. Content 361 includes cached content (e.g., origin content and/or modified content), such as the web content examples in FIG. 1, which can include text, data, pictures, video, audio, web pages, scripting, code, dynamic content, or other network content. Content 361 can also include tracking elements, such as transparent GIFs, web bugs, JavaScript tracking elements, among other tracking elements. In this example, content 361 includes network content and web pages associated with one or more websites, as indicated by www.gamma.gov, www.alpha.com, and www.beta.net, along with associated tracking elements 380-382. The content 361 may include both origin content (i.e., content as received from an origin server or similar source) and modified content (i.e., content modified by an transitional cache node as described herein).

In implementations where an edge or transitional cache node consults stored data such as a database, lookup table, historical data or the like to obtain data and/or instructions concerning modification of content, as noted above with regard to some implementations, a repository of such transitional information can be used. Storage system 320 can also include a transitional information repository 391 (similar to repository 191 of FIG. 1), which can be updated via historical data collected by cache node 300 and via instructions from authorized sources via network interface 305.

Cache node 300 is generally intended to represent a computing system with which at least software 330 and 340 are deployed and executed in order to render or otherwise implement the operations described herein. However, cache node 300 can also represent any computing system on which at least software 330 and 340 can be staged and from where software 330 and 340 can be distributed, transported, downloaded, or otherwise provided to yet another computing system for deployment and execution, or yet additional distribution.

Figure 4:
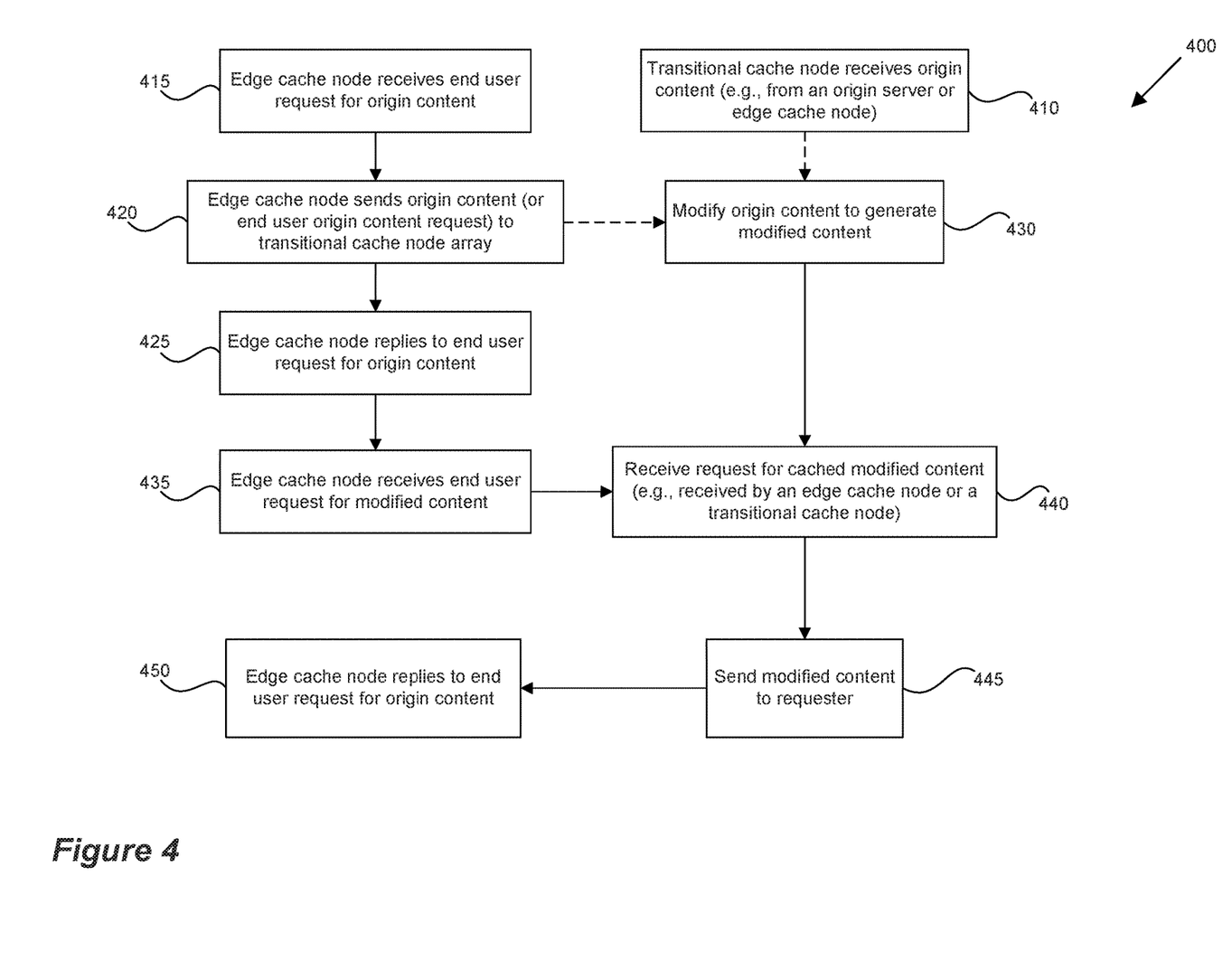
FIG. 4 illustrates a method of operation of a content delivery system.

FIG. 4 illustrates one or more implementations of a method of operation 400 for a content delivery network implementing transitional caching. A transitional cache node receives origin content (410). This origin content can be sent by an edge cache node or an origin server, for example, pre-caching origin content based on transitional information such as historical data and/or instructions (e.g., as might be stored and made available in a transitional information storage unit 191 in the exemplary system of FIG. 1). An edge cache node receives an end user request for origin content (415) and sends the origin content (or the end user content request) to the transitional cache node (420). The end user request for origin content is replied to by the edge cache node (425).

Once the transitional cache node array has the origin content, modifying the origin content to generate modified content is then performed in one or more transitional cache nodes (430), in some implementations based on the transitional information (e.g., historical data, CDN instructions, origin server instructions, content provider instructions). Again, the modification (pre-processing in some implementations) of the origin content can include (as non-limiting examples) re-writing origin content in various languages, translation, transcoding data (e.g., video) to prevalent bit rates, compressing or otherwise adjusting data (e.g., images) to accommodate prevalent sizes and formats, and transforming files (e.g., CSS and JavaScript files). The generated modified content is cached in the transitional cache node or can be sent to an edge cache node in some implementations. An end user request for the modified content is then received (435) at an edge cache node (which can be the same or a different edge cache node than handled the origin content request). The modified content request is passed to the transitional cache node array (440) where the modified content is retrieved from its caching location and is then sent (445) to the edge cache node handling the modified content request. That edge cache node responds to the end user by sending the requested modified content (450) to the requester.

Figure 5:
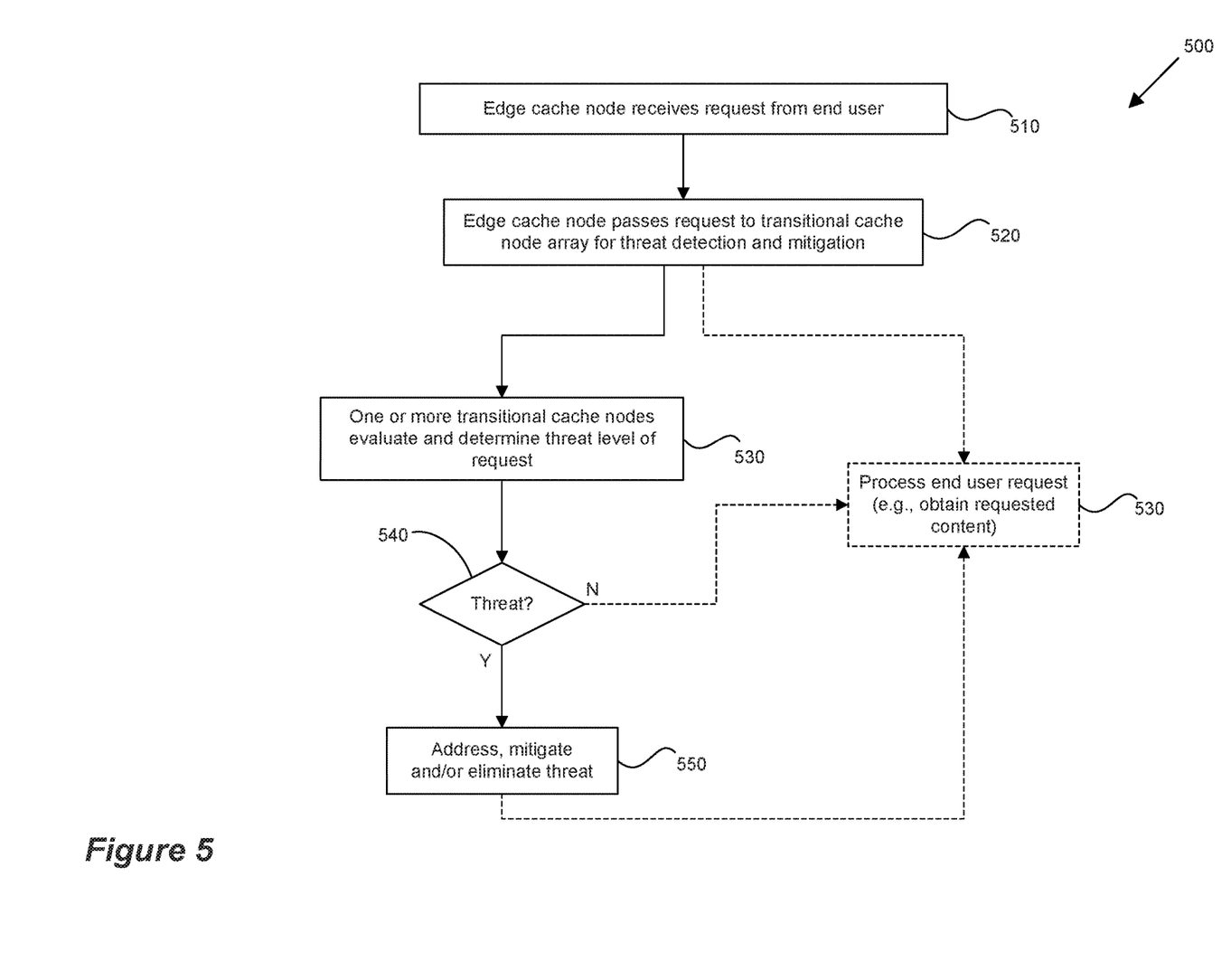
FIG. 5 illustrates a method of operation of a content delivery system.

In one or more additional implementations of a method of operation 500 as illustrated in FIG. 5, a transitional cache node array can act in a threat detection and mitigation role (in addition to or in lieu of an origin content processing role). Because origin servers and the like are accessible via the Internet, they may be the subject of attacks that can include, among other things, denial of service (DoS) attacks, query floods, excessive bandwidth use, spam POSTs, SQL injection POSTs, cross-site scripting POSTs, or requests that otherwise exploit servers. Attacks can be implemented using bots used in a botnet attack. An end user request is received by an edge cache node (510) and the edge cache node passes that request to a transitional cache node array (520) for processing. The transitional cache node array processes the request (530) (e.g., by obtaining the content requested by the end user). Additionally, either sequentially or in parallel, the transitional cache node array processes the end user request to determine whether or not it is a threat to the CDN's operation and/or an origin server or the like (e.g., a DoS attack). Depending on the outcome of the threat detection and mitigation processing (540), either the content is sent responsively to the requester (550) or the threat detection and mitigation process is continued to address the potential problem (560).

Figure 6A:
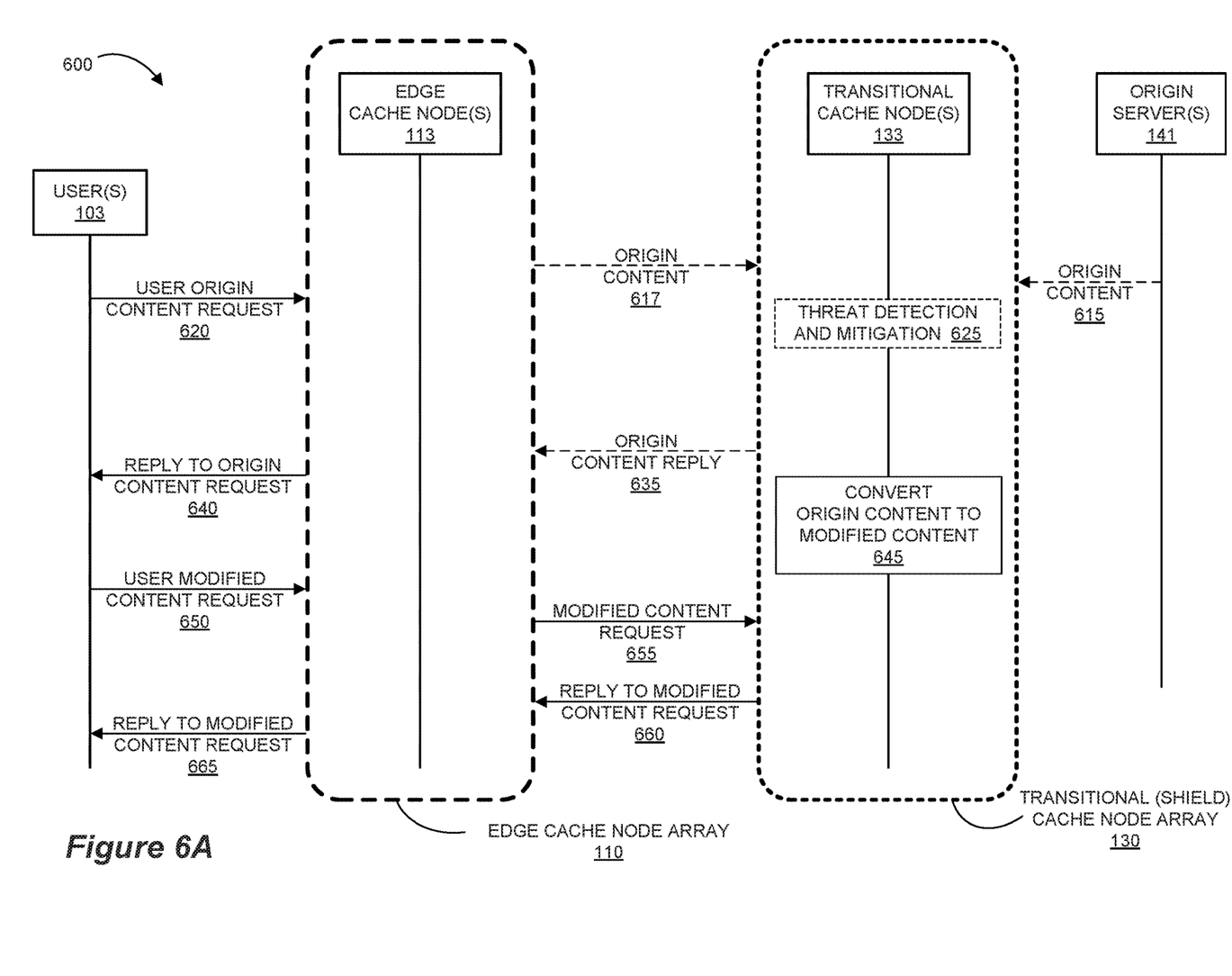
FIG. 6A is a sequence diagram illustrating an exemplary method of operating a communication system.

FIG. 6A is a method flow diagram illustrating aspects of one or more implementations of methods of operation 600 of a communication system, such as a content delivery network system. In this example edge cache node(s) 113 (which can, for example, be integrated together as an edge cache node array 110) receive and respond to content requests from end user(s) 103. Edge cache node(s) 113 can communicate with transitional cache node(s) 133 (which can, for example, be integrated together as a transitional cache node array 130 that can also function as a shield node array). Transitional cache node(s) 133 communicate with one or more origin server(s) 141.

In some implementations pre-caching can be used so that origin content from origin server(s) 141 can be used to pre-fill storage in transitional cache node(s) 133 (615). Moreover, origin content can be sent from edge cache node(s) 113 to transitional cache node(s) 133 (617) to pre-cache origin content (and permit early modification of origin content to modified content in one or more transitional cache nodes).

An edge cache node receives an end user request for origin content (620). If the edge cache node has already cached the requested origin content, then the edge cache node can send that in a reply (640). If the edge cache node does not have the requested origin content, then it can obtain that requested origin content from intermediary transitional cache node(s) 133 (635) before sending the reply (640). In some implementations method of operation 600 might also implement threat detection and mitigation 625 if the edge cache node(s) 113 provides the end user origin content request to transitional cache node(s) 133.

Transitional cache node(s) 133 modify origin content to generate modified content (645) using transitional information (e.g., as instructed or based on historical data or the like). As noted in connection with the transitional information 191 FIG. 1, various types of data and/or instructions may be made available for evaluation of these content modification functions. When a request from edge cache node(s) 113 is received by edge cache node(s) 113 for modified content (650), the edge cache node(s) 113 can then request the modified content from transitional cache node(s) 133 (655). If the modified content is a popular "variation" or other modification of origin content, it will be cached in transitional cache node(s) 133 and can be sent in a reply (660) to edge cache node(s) 113. The modified content is then sent by edge cache node(s) 113 to edge cache node(s) 113 (665).

Figure 6B:
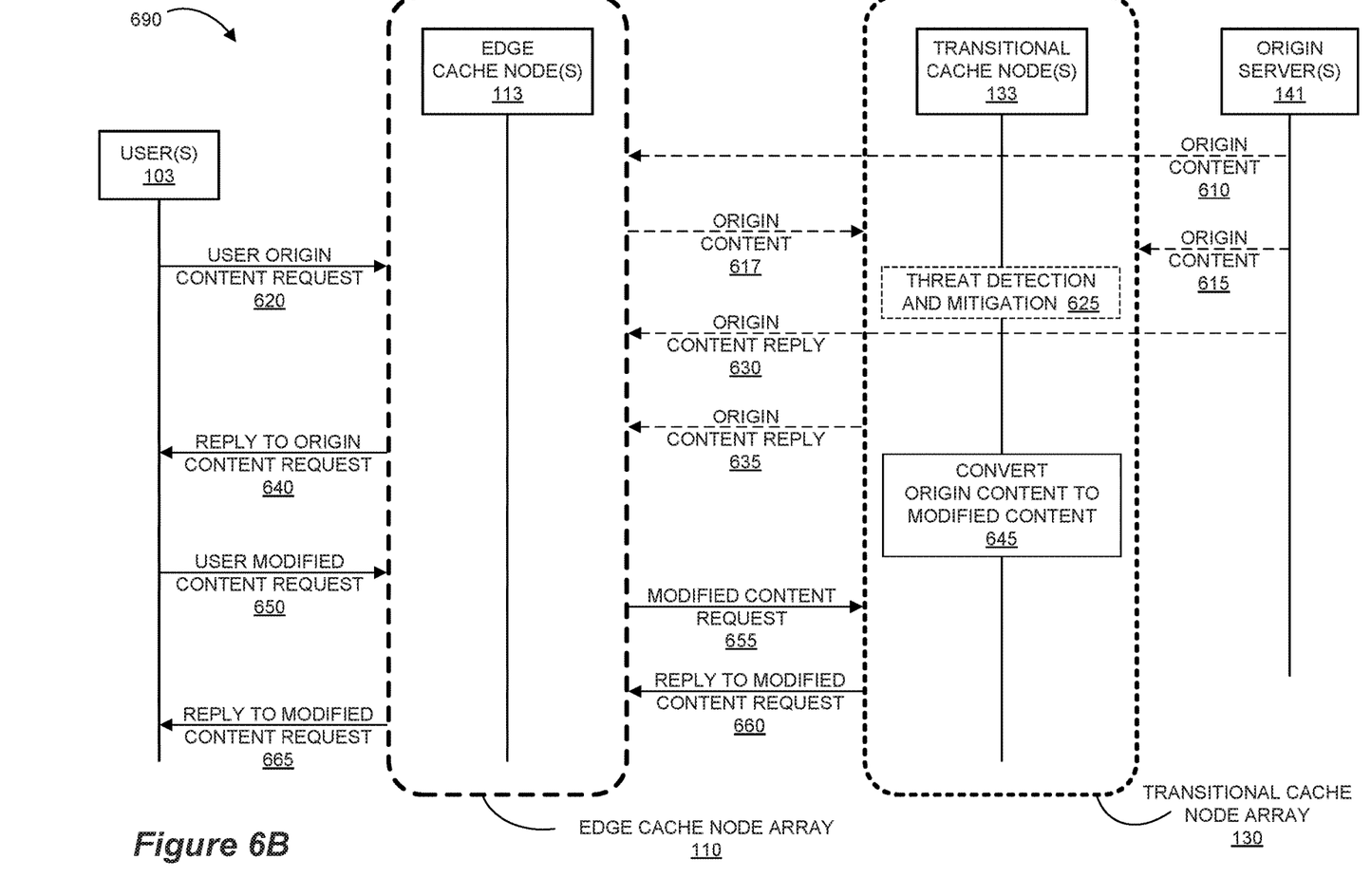
FIG. 6B is a sequence diagram illustrating an exemplary method of operating a communication system.

Method of operation 690 of FIG. 6B is similar to method of operation 600 in FIG. 6A, except that in some implementations pre-caching can be used so that origin content from origin server(s) 141 can be used to pre-fill storage in both of edge cache node(s) 113 (610) and/or transitional cache node(s) 133 (615). In FIG. 6B if the edge cache node does not have the requested origin content, then it can obtain that requested origin content from origin server(s) 141 (630) and/or transitional cache node(s) 133 (635) before sending the reply (640).

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A content delivery network system comprising:
a plurality of edge cache nodes, each edge cache node configured to:
receive end user content requests;
obtain origin content from an origin content source; and
respond to end user requests; and
a transitional cache node array configured to:
receive content requests from at least one of the plurality of edge cache nodes;
perform threat detection and mitigation regarding end user requests received by at least one of the edge cache nodes;
receive origin content from at least one of the following:
one of the plurality of edge cache nodes;
the origin content source;
modify origin content to generate modified content;
respond to edge cache node content requests by sending origin content and modified content.

2. The system of claim 1 wherein the transitional cache node array comprises a plurality of transitional cache nodes configured in parallel.

3. The system of claim 1 wherein the transitional cache node array comprises a plurality of transitional cache nodes configured in series.

4. The system of claim 1 wherein modification of origin content to generate modified content is based at least in part on historical data relating to operation of the plurality of edge cache nodes.

5. The system of claim 1 wherein modifying origin content comprises one of the following:
language translation;
transcoding;
image compression;
reformatting.

6. The system of claim 1 wherein each edge cache node in the plurality of edge cache nodes is configured to:
select origin content for modification by the transitional cache node array; and
send selected origin content to the transitional cache node array for modification.

7. A method of operating a content delivery network system, the method comprising:
a first transitional cache node in a transitional cache node array receiving origin content from at least one of the following:
one of a plurality of edge cache nodes;
an origin server;
the first transitional cache node modifying the received origin content to generate modified content;
the first transitional cache node receiving a content request from at least one of the plurality of edge cache nodes;
the first transitional cache node performing threat detection and mitigation regarding the content request;
the first transitional cache node sending the modified content to the requesting edge cache node.

8. The method of claim 7 wherein the origin content modified by the first transitional cache node is selected based on transitional information that comprises content provider instructions.

9. The method of claim 7 wherein the origin content modified by the one or more transitional cache nodes in the transitional cache node array is selected based on transitional information that comprises historical data relating to operation of the plurality of edge cache nodes.

10. The method of claim 7 wherein the transitional cache node array comprises a plurality of transitional cache nodes coupled in parallel between the origin server and the plurality of edge cache nodes.

11. The method of claim 7 wherein the transitional cache node array comprises a plurality of transitional cache nodes coupled in series between the origin server and the plurality of edge cache nodes.

12. The method of claim 7 wherein modifying origin content comprises one of the following:
language translation;
transcoding;
image compression;
reformatting.

13. The method of claim 7 further comprising:
the first transitional cache node evaluating the content request to determine whether the content request is a threat to the origin server or the content delivery network.

14. A method of operating a content delivery network system, the method comprising:
a first edge cache node in an edge cache node array in a content delivery network receiving an end user origin content request;
the first edge cache node responsively sending an origin content reply to the end user in response to the end user origin content request;
a first transitional cache node in a transitional cache node array modifying the origin content to generate modified content, based, at least in part, on an intelligent caching criterium to determine that the origin content is likely to benefit from the modifying, wherein the transitional cache node array is in communication with the edge cache node array;
a second edge cache node in the edge cache node array receiving an end user modified content request;
the second edge cache node sending the end user modified content request to the first transitional cache node;
the second edge cache node receiving the modified content from the first transitional cache node; and
the second edge cache node responsively sending a modified content reply in response to the end user modified content request.

15. The method of claim 14 wherein the first edge cache node obtains the origin content from one of the following:
the transitional cache node array;
an origin server.

16. The method of claim 14 wherein modifying the origin content to generate modified content comprises one of the following:
translating a portion of the origin content into a different language;
transcoding a portion of the origin content;
altering an image in the origin content;
reformatting a portion of the origin content.

17. The method of claim 14 wherein the transitional cache node array is configured to cache origin content and modified content for the edge cache node array.

18. The method of claim 17 wherein the origin content and modified content that is cached in the transitional cache node array is selected based on one or both of the following:
content provider instructions;
historical data relating to operation of the plurality of edge cache nodes.

* * * * *